United States Patent [19]
Geiger

[11] 3,817,565
[45] June 18, 1974

[54] BUMPER FOR MOTOR VEHICLES
[75] Inventor: Friedrich Geiger, Boblingen, Germany
[73] Assignee: Daimler-Benz Aktiengesellschaft, Stuttgart, Germany
[22] Filed: Dec. 1, 1972
[21] Appl. No.: 311,146

[30] Foreign Application Priority Data
Dec. 3, 1971  Germany............................ 2159946

[52] U.S. Cl..................................... 293/63, 293/62
[51] Int. Cl............................................ B60r 19/06
[58] Field of Search............. 293/60, 62, 63, 70, 88

[56] References Cited
UNITED STATES PATENTS
| | | | |
|---|---|---|---|
| 1,800,142 | 4/1931 | Heagny | 293/62 |
| 2,174,252 | 9/1939 | Altmyer | 293/62 |
| 2,633,378 | 3/1953 | Kraeft | 293/62 |

Primary Examiner—M. Henson Wood, Jr.
Assistant Examiner—Robert Saifer
Attorney, Agent, or Firm—Craig & Antonelli

[57] ABSTRACT

A bumper for motor vehicles, particularly for passenger motor vehicles, which is supported at fixed vehicle parts, such as at longitudinal bearers by way of at least two elastically deformable deformation members; the bumper is bent-off at its ends while bumper bars are provided on both sides of the vehicle which extend up to the wheels cutouts of the wheel casings and are secured at the vehicle body; the bumper is thereby so arranged between the bumper bars that its ends are freely displaceable with respect to the bumper bars both in the vehicle longitudinal direction as also transversely with respect thereto.

12 Claims, 3 Drawing Figures

BUMPER FOR MOTOR VEHICLES

The present invention relates to a bumper for motor vehicles, especially for passenger motor vehicles which is supported at parts fixedly arranged at the vehicle by way of at least two, elastically yielding deformation members.

The possibility is already described in the German Patent 1,234,554 to so support a bumper by means of spring members of rubber that it projects freely movably from the vehicle body outer covering or panel. The free inward spring movement is slight in this construction so that already in case of a slight impact a damaging of the vehicle body outer covering is to be expected.

In order that the vehicle front portion is protected also laterally within the area of the fenders, the tendency exists ever more to so bend off the bumpers at their ends that their lateral boundary edges terminate approximately with the cutouts of the wheel casings. Though such an installation is sufficient as protection with parked vehicles, it cannot satisfy the requirements in particular in case of lateral or oblique impacts.

It is the aim of the present invention to provide a bumper which does not entail the aforementioned disadvantages and which in particular is capable also in case of obliquely occurring impacts to protect the vehicle body parts which are located nearby.

Consequently, a bumper for motor vehicles, especially for passenger motor vehicles is proposed which is supported at fixed vehicle parts by way of at least two elastically yielding deformation members, in which according to the present invention the bumper is bent off at its ends, and on both sides of the vehicle, bumper bars are provided which extend up to the wheels cutouts of the wheel casings, preferably only interrupted by the latter, and are secured at the body, between which the bumper is so arranged that its ends are freely displaceable with respect to the bumper bars both in the vehicle longitudinal direction as also transversely thereto.

According to a further feature of the present invention, the bumper bars and bumper are disposed at the same height. A good optical overall impression is achieved if the forward terminal edge of the bumper bars and the associated terminal edges of the bent-off ends of the respective bumper are disposed in a common plane.

Accordingly, it is an object of the present invention to provide a bumper which avoids by simple means the aforementioned shortcomings and drawbacks encountered in the prior art.

Another object of the present invention resides in a bumper for motor vehicles, especially for passenger motor vehicles, which offers adequate protection for the vehicle body outer covering also in case of light impacts.

A further object of the present invention resides in a bumper for motor vehicles, especially passenger motor vehicles which satisfies also the requirements in case of lateral or oblique impacts.

Still another object of the present invention resides in a bumper for motor vehicles which not only achieves the aforementioned aims and objects but also results in a good optical impression conveying a pleasing, aesthetic appearance of the vehicle.

These and further objects, features and advantages of the present invention will become more apparent from the following description when taken in connection with the accompanying drawing which shows, for purposes of illustration only, one embodiment in accordance with the present invention, and wherein.

Figure 1:
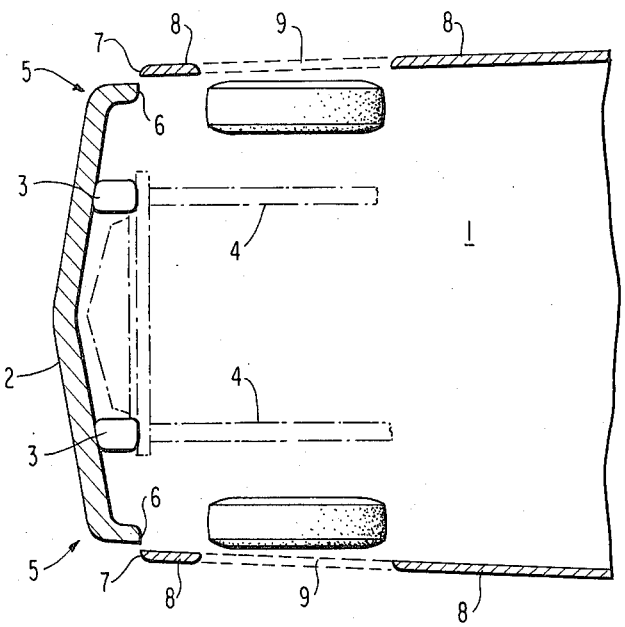
FIG. 1 is a schematic plan view of a passenger motor vehicle front section with a bumper and bumper bar arrangement according to the present invention.
Figure 2:
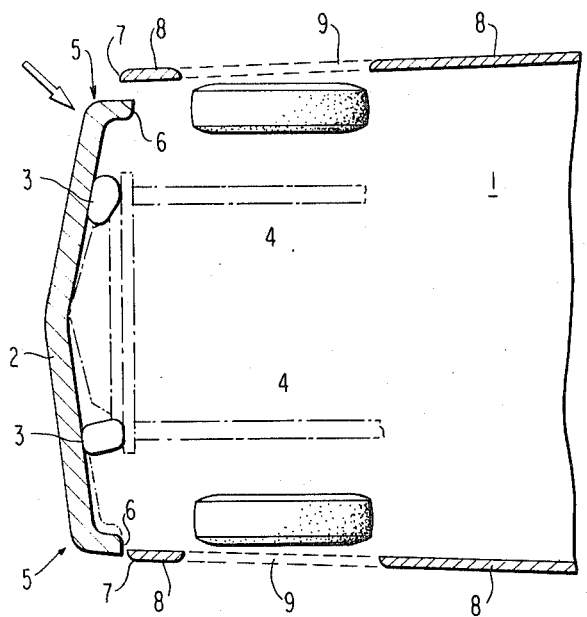
FIG. 2 is a schematic plan view, similar to FIG. 1, and illustrating the bumper and bumper bar arrangement in accordance with the present invention in case of an impact angle of about 45°.
Figure 3:
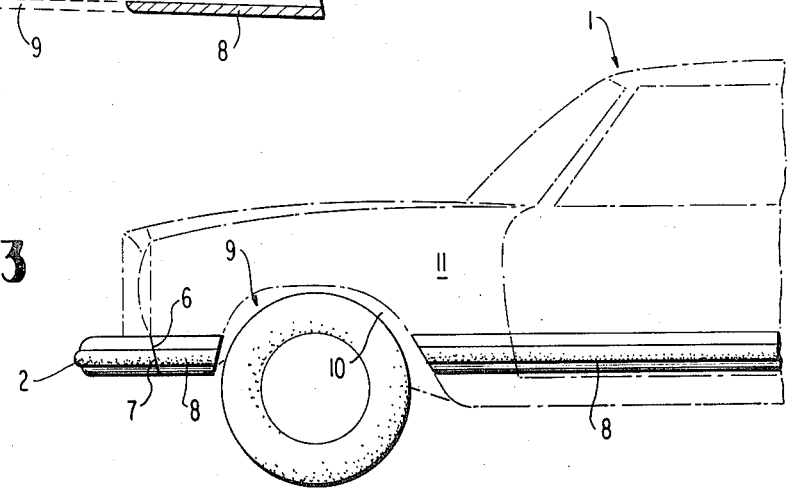
FIG. 3 is a schematic side elevational view of a passenger motor vehicle equipped with a bumper and bumper bar of the present invention.

Referring now to the drawing wherein like reference numerals are used throughout the various views to designate like parts, the passenger motor vehicle 1, illustrated in its contours, includes a forward bumper 2 which is supported at vehicle longitudinal bearers 4 by way of two elastically yielding deformation members 3 of any conventional construction. The bumper 2 which may also carry at its outer side a bulge or bead not illustrated in detail, for example, made of rubber, is bent off at its ends 5, and the terminal edges 6 are in a common plane together with the terminal edges 7 of bumper bars 8 which extend up to the wheel cutouts 9 of the wheel casings 10 (FIGS. 1 and 2). These bumper bars 8, which are preferably matched to the appearance of the bumper 2, are secured at the body 11 and extend on each vehicle side—interrupted by the cutouts of the wheel casings 10—from the front to the rear bumper (not illustrated) which is of similar construction as the front bumper 2.

If an oblique impact occurs against the bumper 2 in the indicated direction of the arrow—as is illustrated in FIG. 2—then the deformation members 3 deform in such a manner that the deformation member 3 near the impact is compressed whereas the other deformation member 3 is extended or stretched. As a result thereof, no contact takes place between the bumper 2 and the adjoining bumper bar 8. Also in case of an impact in the vehicle longitudinal direction, the ends 5 slide freely past the bumper bars 8 so that the steerability of the vehicle is not impaired at any time.

While I have shown and described only one embodiment in accordance with the present invention, it is understood that the same is not limited thereto but is susceptible of numerous changes and modifications as known to those skilled in the art, and I therefore do not wish to be limited to the details shown and described herein but intend to cover all such changes and modifications as are encompassed by the scope of the appended claims.

What I claim is:

1. A bumper arrangement for motor vehicles having a fixed vehicle part, said arrangement comprising: a bumper disposed substantially along the entire width of the vehicle, said bumper being provided with bent off laterally extending end portions, at least two elastically yielding deformation means for mounting said bumper to the fixed vehicle part, and bumper bar means are provided on both sides of the vehicle for protecting the same, said bumper bar means being provided with terminal edge portions, said bumper being disposed between said bumper bar means and unconnected therewith to permit said laterally extending end portions to be freely displaceable between said terminal edge portions of said bumper bar means both in the vehicle longitudinal direction and transversely with respect thereto upon application of an impact force on said bumper to preclude transmission of the impact force to said bumper bar means.

2. A bumper according to claim 1, wherein the motor vehicle includes wheels and a body, said body being provided with wheel cutouts in the area of the wheels, and wherein said bumper bar means extends up to the wheel cutouts and are secured at the body.

3. A bumper according to claim 2, wherein said bumper bar means are only interrupted by said cutouts.

4. A bumper according to claim 3, wherein said bumper and bumper bar means are disposed at the same height.

5. A bumper according to claim 4, wherein the terminal edge of a bumper bar means and an associated terminal edge of the corresponding bent-off laterally extending end portion of said bumper is disposed in substantially a common plane.

6. A bumper according to claim 5, wherein the vehicle is provided with a front and rear bumper and said bumper bar means extends from said front bumper toward said rear bumper.

7. A bumper according to claim 6, wherein the motor vehicle is a passenger motor vehicle and said front and rear bumpers are of similar construction.

8. A bumper according to claim 7, wherein said bumper bar means are matched to said bumper in appearance.

9. A bumper according to claim 1, wherein said bumper and bumper bar means are disposed at the same height.

10. A bumper according to claim 9, wherein said bumper bar means are matched to said bumper in appearance.

11. A bumper according to claim 1, wherein the terminal edge of a bumper bar means and an associated terminal edge of the corresponding bent-off laterally extending end portion of said bumper is disposed in substantially a common plane.

12. A bumper according to claim 1, wherein said bumper bar means are matched to the bumper in appearance.

* * * * *